Patented Oct. 8, 1940

2,217,119

UNITED STATES PATENT OFFICE 2,217,119

DISPERSION OF PARACOUMARONE RESIN AND PROCESS OF PRODUCING SAME

Earl G. Kerr, Cliffside Park, N. J., assignor to The Barrett Company, New York, N. Y., a corporation of New Jersey No Drawing. Application June 9, 1936,
Serial No. 84,291

10 Claims. (Cl. 260—23)

This invention is directed to emulsions or suspensions of resins of the coumarone-indene type and to processes of making such emulsions.

Dispersions of saponifiable resins, such as rosin, have been used heretofore in the form of rosin size or rosin soaps for the sizing of paper and in the formation of paper board and similar products. Resins such as paracoumarone, paraindene, and similar resins derived from coal tar distillates are comparatively inexpensive and form excellent sizing materials and binding agents but such resins are not saponifiable. When it is desired to use resins of this type for sizing waterproofing materials, the resins have heretofore been dissolved in an organic solvent which is subsequently volatilized. The latter process has the objection that solvents employed for dissolving resins of the coumarone-indene type are expensive and many are inflammable. Furthermore, their use usually requires the installation of relatively costly solvent-recovery apparatus.

It has been proposed to disperse resins of the coumarone-indene type by melting or grinding the resin and distributing the molten or finely divided resin throughout a water solution of a dispersing agent, such as sodium silicate.

Among the objects of this invention are to produce a dispersion or emulsion of resin of the coumarone-indene type which is more stable on storage than such emulsions produced by heretofore known procedures, which can be diluted without agglomerating the dispersed particles, and which upon the addition of small quantities of precipitant, such as aluminum sulphate or calcium hydroxide, will agglomerate rapidly and completely.

These and other objects and features of this invention will appear from the following description thereof in which reference is made to typical formulae and to procedures for producing dispersions of resins of the coumarone-indene type.

In accordance with this invention, resins of the coumarone-indene type are dispersed to form a relatively stable emulsion or suspension. The nature of the dispersion produced is largely dependent upon the manner in which the resin is treated. In the case of low melting point paracoumarone resin which is dispersed by introducing the resin in liquid form into an aqueous solution, it is probable that the resin is emulsified, whereas in the case of high melting point resin, which upon introduction in liquid form into a hot aqueous solution and the subsequent cooling of the solution, forms minute particles, it is probable that the resin is suspended in the form of minute solid particles.

I have found that improved stable emulsions of paracoumarone resin may be produced by adding a mixture of the resin and a vegetable or animal fat or oil to an alkaline clay jelly while agitating the resultant mixture, as for example, by a propeller type agitator. As the emulsifying agent, corn oil fatty acid, oleic acid, or casein may be employed. The paracoumarone resin used may have a melting point of from 10° to 106° C. or higher. Preferably, the clay jelly is prepared by dispersing bentonite in water at room temperature and adding caustic soda in solution thereto, but other procedures can be used successfully as described below. To produce a stable emulsion, it is important that free alkali be present in the emulsion, and accordingly, the amount of alkali added to the clay should be in excess of that necessary to completely saponify the fatty acid.

For economical reasons, the amount of clay incorporated in the emulsion should be reduced to a minimum. In the production of the stable emulsions of this invention, a small percentage of clay is employed; preferably from two to six percent by weight of the final emulsion.

The following examples are illustrative of preferred methods of practicing my invention to produce dispersions or emulsions of the resin-water type:

*Example 1.*—3500 parts of water were slurried with 250 parts of bentonite clay, the mixture heated to a temperature of about 80° C., 700 parts of molten paracoumarone resin having a melting point of 45°–55° C. and previously heated to a temperature of 80° to 100° C. added to this mixture while stirring, the heating then discontinued, and while continuing the stirring, 70 parts of rosin oil and 75 parts of silicate of soda (having a density of 42.2° Bé., containing 38.4% of sodium silicate in which there is a ratio of about 3.22 parts by weight of $SiO_2$ to one part by weight of $Na_2O$) added. The resultant emulsion tested alkaline.

By this method, there was produced a rather heavy, stable emulsion consisting of approximately 15.2 percent paracoumarone resin, 76.3 percent water, 5.4 percent bentonite clay, 1.6 percent silicate of soda and 1.5 per cent rosin oil.

*Example 2.*—3500 parts of water were slurried with 200 parts of bentonite clay, the mixture heated to a temperature of about 80° C., 700 parts of paracoumarone resin having a melting point of 45° to 55° C. and previously heated to a temperature of 80° C. to 100° C. added to the bentonite clay, the heating of this mixture then discontinued, and while continuing the stirring, 60 parts of oleic acid and 100 parts of ammonium hydroxide (28–29% NH₃) added. The resultant emulsion tested alkaline.

By this method, there was produced a rather heavy, stable emulsion composed of approximately 15.3 percent paracoumarone resin, 76.8 percent water, 4.4 percent bentonite clay, 1.3 percent oleic acid, and 2.2 percent ammonium hydroxide.

*Example 3.*—A clay jelly was prepared by dispersing 4 parts by weight of bentonite in 67 parts of water at room temperature and adding 7.5 parts of sodium hydroxide. A mixture of 50 parts of paracoumarone resin having a melting point of 10° C. and 2.5 parts of corn oil fatty acid was heated to 80° C. The mixture thus reduced to a fluid condition was poured into the clay jelly while agitating the same during the pouring, which required a few minutes, the temperature of the mixture rising to about 45° C. The amount of caustic soda in the emulsion was sufficient to completely saponify the fatty acid and to provide a small excess of free alkali which stabilized the clay jelly. There was thus produced a stable emulsion constituted of 56.5 percent water, 3.1 percent bentonite, 0.6 percent caustic, 38.1 per cent paracoumarone resin, and 1.9 percent corn oil fatty acid. By slightly increasing the bentonite content, the viscosity of the emulsion was greatly increased. Hence, it is possible to arbitrarily select a convenient paracoumarone-water ratio and impart a desired degree of consistency to the emulsion by adjusting the bentonite content.

*Example 4.*—4 parts by weight of casein powder was allowed to swell in 71 parts of water containing 0.9 part of sodium hydroxide. 3.8 parts of bentonite was stirred into the solution, jelling immediately. 49.7 parts of paracoumarone resin having a melting point of 10° C. heated to 80° C. was slowly stirred into the jelly. The resultant emulsion was satisfactory in all respects. It showed no settling after fourteen days.

*Example 5.*—A mixture of paracoumarone resin having a melting point of 60° C. and corn oil fatty acid in the proportion of 48.1 percent paracoumarone based on the final emulsion to 1.6 percent of corn oil fatty acid heated to a temperature of 80° C. was stirred into a clay jelly constituted of 2.6 percent bentonite, 47.2 percent water, and 0.5 percent caustic (dry). The temperature of the clay jelly at the beginning of the introduction of the molten paracoumarone, corn oil fatty acid mixture was 25° C. A stable emulsion was thus produced. In like manner, stable emulsions of paracoumarone resin having a melting point of 125° C. were produced, the proportions of the constituents of the emulsion being as follows:

| | Per cent |
|---|---|
| Water | 56.3 |
| Bentonite | 3.0 |
| Caustic (dry) | 0.6 |
| Paracoumarone | 38.2 |
| Corn oil fatty acid | 1.9 |

The temperature of the clay jelly into which the mixture of paracoumarone and corn oil fatty acid was introduced was 80° C. After two weeks, the emulsions showed no signs of settling or decomposing.

The proportion of paracoumarone in the emulsion may be varied within wide limits. For example, from 15 to 70 per cent of the dispersion may be constituted of paracoumarone resin although from 40 to 60 percent has been found to give the most convenient consistency, one just fluid enough to permit pouring from a screw top can or from the bung hole of a barrel. The soap content of the emulsion may be as low as 0.5 percent by weight of the completed emulsion and as high as 3.5 percent. A soap content of 1.5 to 2.0 per cent by weight of the final emulsion gave satisfactory results.

For emulsions containing about 15 per cent of paracoumarone resin and about 75 percent of water (as in Examples 1 and 2 above), one part by weight of bentonite was used for approximately three parts by weight of the paracoumarone resin. As the proportion of paracoumarone in the emulsions is increased, and the water decreased, the ratio of bentonite to paracoumarone may be lowered quite sharply. The minimum bentonite content of the emulsion is dependent on the proportion and melting point of the paracoumarone emulsified. The ratio of bentonite to paracoumarone in the case of soft resins may be one part bentonite to 13 parts paracoumarone. In the case of hard resins, the amount of bentonite may be decreased to one part bentonite to approximately 50 parts of paracoumarone. From the above examples, it will be noted that in the case of paracoumarone resin of 10° C. melting point, a suitable ratio of bentonite to paracoumarone was about 1 to 13 (Example 3 above). In the case of paracoumarone of 60° C. melting point, I have found a suitable ratio of bentonite to paracoumarone was about 1 to 23, and in the case of paracoumarone resin of 80° C. melting point, a suitable ratio was 1 to 52.

Any suitable type of apparatus may be employed for agitating, mixing or blending the materials to produce the dispersions of the present invention. It is preferred to employ apparatus having a bladed propeller driven at a high speed by means of a motor or other suitable driving mechanism. In dispersing a paracoumarone of high melting point, for example, about 105° C. or higher, the clay jelly should be maintained in a closed kettle under pressure and at a temperature near the melting point of the paracoumarone during the introduction of the coumarone-fatty oil mixture.

Resins made by polymerizing other hydrocarbons similar to coumarone and indene, e. g., resins made by treating cracked petroleum distillate with aluminum chloride or like polymerizing agent, behave in many physical and chemical respects like paracoumarone resin. This invention is applicable to such resins and they are to be regarded as the equivalent of paracoumarone resin in practicing the invention and as coming within the scope of the claims.

The dispersions obtained in the practice of this invention are adapted for use in the sizing of paper, in the formation of fiber board and laminated products, and for numerous other purposes where resins are employed.

In using the dispersion for sizing paper, it may be added to a pulp of paper or fiber in a beater, the amount and character of the dispersion used being regulated to obtain the desired proportion of resin to fiber. The dispersion may be intimately mixed with the pulp in the beater, and thereafter a precipitant or deflocculating agent, such as alum, may be added to the materials to cause the resin to precipitate onto the fiber. The alum reacts with the soap of the fatty acid to form an insoluble soap, thus effecting the decomposition of the soap emulsifying agent of the emulsion and causing the rapid precipitation of the paracoumarone particles in solid non-adhesive condition onto the fibers of the pulp. The resultant mixture can, therefore, be readily sheeted without difficulty since the non-adhesive resin particles will not adhere to the paper making instrumentalities but remain admixed with the fibrous material. The pulp may be formed into sheets of the desired thickness and the sheets dried and pressed. Heating of the sheet causes the coalescence of the solid resinous particles so that the resin is substantially homogeneously distributed throughout the sheet and effectively waterproofs the same.

The term "dispersion" as used throughout the specification and claims in referring to the products obtained in practicing my process is intended to include all such products as are described above whether they are suspensions or emulsions.

I claim:

1. The method of producing a dispersion of paracoumarone resin which comprises melting the resin and distributing the molten resin throughout an aqueous alkaline colloidal clay jelly.

2. The method of producing a dispersion of paracoumarone resin in an aqueous medium, which comprises distributing the resin in an aqueous alkaline colloidal clay jelly and incorporating soap in the dispersion of resin.

3. The method of producing a dispersion of paracoumarone resin which comprises distributing a mixture of paracoumarone resin and fatty acid throughout an aqueous alkaline bentonite jelly.

4. The method of producing a dispersion of paracoumarone resin which comprises distributing a mixture of paracoumarone resin and corn oil fatty acid in liquid condition throughout an aqueous alkaline colloidal clay jelly.

5. The method of producing a dispersion of paracoumarone resin which comprises distributing a mixture of paracoumarone resin and fatty acid throughout an aqueous alkaline colloidal clay jelly to produce an emulsion in which the ratio of clay to paracoumarone resin is not more than 1 to 3.

6. The method of dispersing paracoumarone resin which comprises liquefying the paracoumarone resin, adding corn oil fatty acid thereto, forming a bentonite jelly containing alkali and water, and introducing the mixture of paracoumarone resin and corn oil fatty acid to the alkali jelly while agitating the same.

7. The method of dispersing paracoumarone resin which comprises liquefying the paracoumarone resin, adding corn oil fatty acid thereto, forming a jelly of bentonite clay and water, adding alkali to the jelly, and introducing the mixture of paracoumarone resin and corn oil fatty acid to the alkaline jelly while agitating the same, the ratio of bentonite to paracoumarone resin being not more than 1 to 3.

8. The method of dispersing paracoumarone resin, which comprises liquefying paracoumarone resin, adding fatty acid thereto, forming a bentonite jelly by mixing from 2 to 6 percent by weight, based on the weight of the final emulsion, of bentonite in water, adding alkali to the jelly, the amount of alkali being in excess of that required to completely saponify the fatty acid, and introducing the mixture of paracoumarone resin and fatty acid to the alkaline jelly while agitating the same.

9. A substantially stable dispersion of paracoumarone resin in an aqueous alkaline dispersing medium consisting of paracoumarone resin in amount equal to from 15 to 70 per cent by weight of the total dispersion, an emulsifying agent, an alkaline reagent, bentonite in amount equal to from about 2 to 6 per cent by weight of the dispersion and water in amount sufficient to render the dispersion of fluid, pourable consistency, said dispersion being dilutable with water without agglomerating the dispersed particles.

10. A substantially stable dispersion of paracoumarone resin in water consisting of paracoumarone resin in amount equal to from about 15 to 70 per cent by weight of the dispersion, a soap of a fatty acid, bentonite clay in amount equal to from about 2 to 6 per cent by weight of the dispersion and an aqueous alkaline solution consisting substantially the remainder of said dispersion, said dispersion being of fluid, pourable consistency and dilutable with water without agglomerating the dispersed particles.

EARL G. KERR.